United States Patent
Huang

[11] Patent Number: 6,059,302
[45] Date of Patent: May 9, 2000

[54] SHOCK-ABSORBING DEVICE FOR TOY STROLLERS

[76] Inventor: Ming-Tai Huang, 4th Floor, No. 302, Sec. 7, Cheng Teh Road, Taipei, Taiwan

[21] Appl. No.: 09/085,499

[22] Filed: May 27, 1998

[51] Int. Cl.[7] ........................................................ B62B 7/00
[52] U.S. Cl. ........................................ 280/47.41; 280/657
[58] Field of Search ............................... 280/650, 38, 39, 280/642, 643, 657, 47.38, 47.41; 16/44; 301/111; 24/598.4, 572, 165, 455; 2/265; 403/301, 302, 329, 206; D2/627; 446/409, 431, 269; 414/910

[56] References Cited

U.S. PATENT DOCUMENTS

| | | | |
|---|---|---|---|
| 2,482,230 | 9/1949 | Welsh | 280/47.41 |
| 2,642,296 | 6/1953 | Leber | 280/47.41 |

*Primary Examiner*—Paul N. Dickson
*Assistant Examiner*—Tony Winner
*Attorney, Agent, or Firm*—Merchant & Gould P.C.

[57] ABSTRACT

A shock-absorbing device for a toy stroller includes a first member having a first end riveted to the upper frame and a second end. The second end of the first member includes a root section and a distal hooked section. The root section has a snapping fastener provided on each of two first lateral faces thereof. The shock-absorbing device further includes a second member having a second end riveted to the lower frame and a second end. The second end of the second member includes two second lateral walls defining a channel therebetween through which the second end of the first member is extended. Each second lateral wall includes an opening defined therein for engaging with an associated snapping fastener. The second member further includes a ridge formed therein for securely engaging with the distal hooked end of the first member.

2 Claims, 6 Drawing Sheets

SHOCK-ABSORBING DEVICE FOR TOY STROLLERS

BACKGROUND OF THE INVENTION

1. Field of the Invention

The present invention relates to a shock-absorbing device for toy strollers for children.

2. Description of the Related Art

FIG. 5 of the drawings illustrates a toy stroller which includes a bed portion 80, a main frame 86, and wheels 88. The bed portion 80 includes a bed frame 82 for mounting a bed 84 thereon. The main frame 86 includes two curved tubes 87, two pairs of cross-hinged links 81, and a U-shaped handle 83. In addition, a lower end of each link 81 is connected to a distal end of an associated curved tube 87 by a spring 85 which acts as a shock-absorbing device. FIG. 6 of the drawings illustrates another prior art toy stroller which includes a bed portion 90, a main frame 95, and wheels (not labeled). The bed portion 90 includes a bed frame 91 for mounting a bed 94 thereon and front and rear adjusting levers 92 and 93. The main frame 95 includes two tubes 98, two pairs of cross-hinged links 97, and a U-shaped handle 99. In addition, a lower end of each link 97 is connected to a distal end of an associated tube 98 by a spring 96 which acts as a shock-absorbing device. However, children and babies may be injured by the exposed springs 85, 96. In addition, the springs 85, 96 are assembled in their fully extended status such that manufacturers must extend the springs, which is difficult and the workers' hands might be injured by sharp ends of the springs.

The present invention is intended to provide an improved shock-absorbing device for toy strollers which mitigates and/or obviates the above-mentioned problems.

SUMMARY OF THE INVENTION

It is a primary object of the present invention to provide a shock-absorbing device for a toy stroller which may effectively absorb shock in a safer way to protect the child who is playing the toy stroller.

In accordance with the present invention, a shock-absorbing device is provided for a toy stroller of the type having a lower frame and an upper frame. The shock-absorbing device comprises a first member having a first end riveted to the upper frame and a second end. The second end of the first member includes a root section and a distal hooked section. The root section has a snapping fastener provided on each of two first lateral faces thereof. The shock-absorbing device further includes a second member having a second end riveted to the lower frame and a second end. The second end of the second member includes two second lateral walls defining a channel therebetween through which the second end of the first member is extended. Each second lateral wall includes an opening defined therein for engaging with an associated snapping fastener. The second member further includes a ridge formed therein for securely engaging with the distal hooked end of the first member.

The second end of the first member includes a first arcuate surface. The second end of the second member includes a second arcuate surface which is engaged with and complimentary to the first arcuate surface.

Other objects, advantages, and novel features of the invention will become more apparent from the following detailed description when taken in conjunction with the accompanying drawings.

DESCRIPTION OF THE PREFERRED EMBODIMENT

Figure 1:
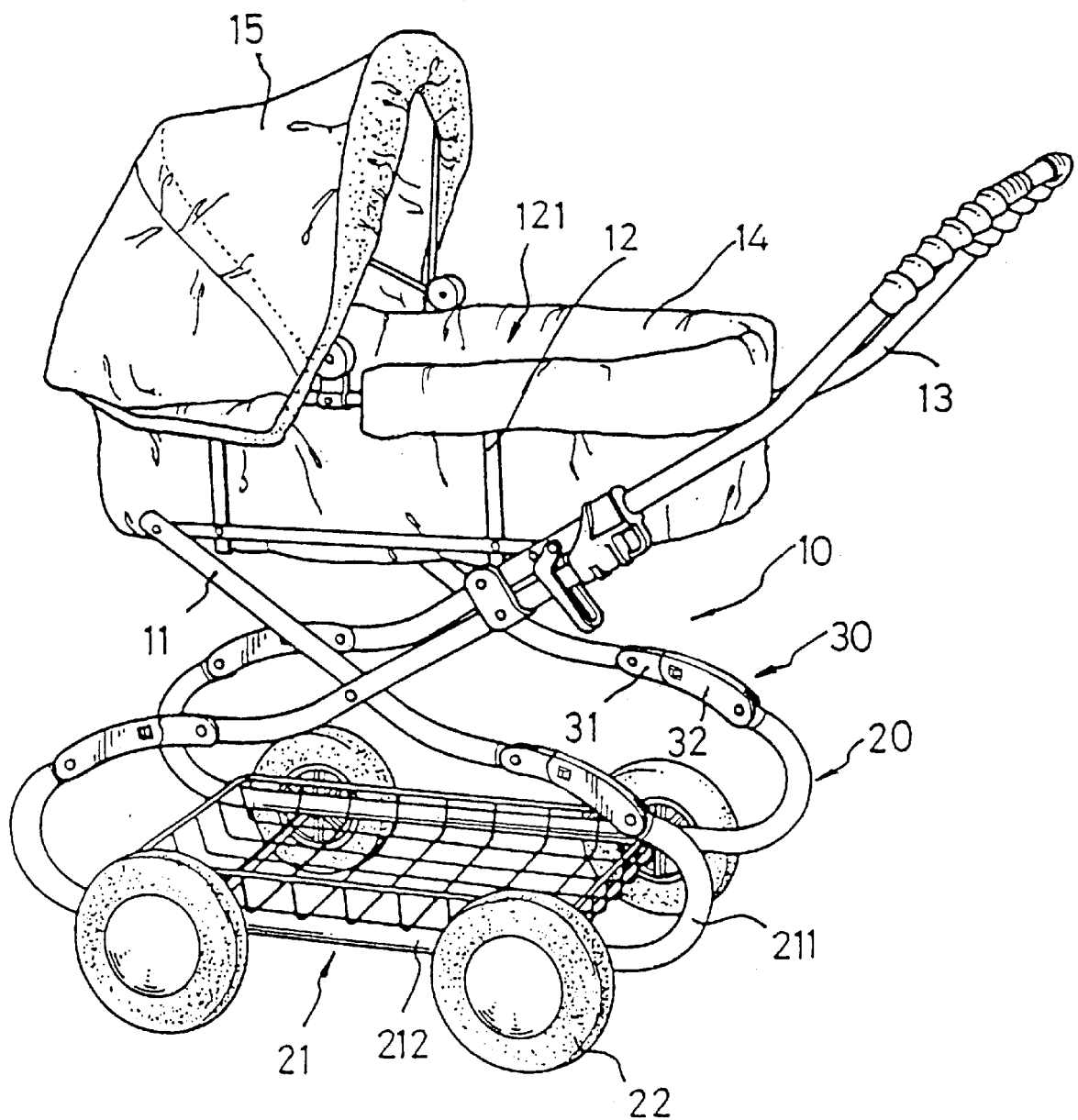
FIG. 1 is a perspective view of a toy stroller with a shock-absorbing device in accordance with the present invention.
Figure 2:
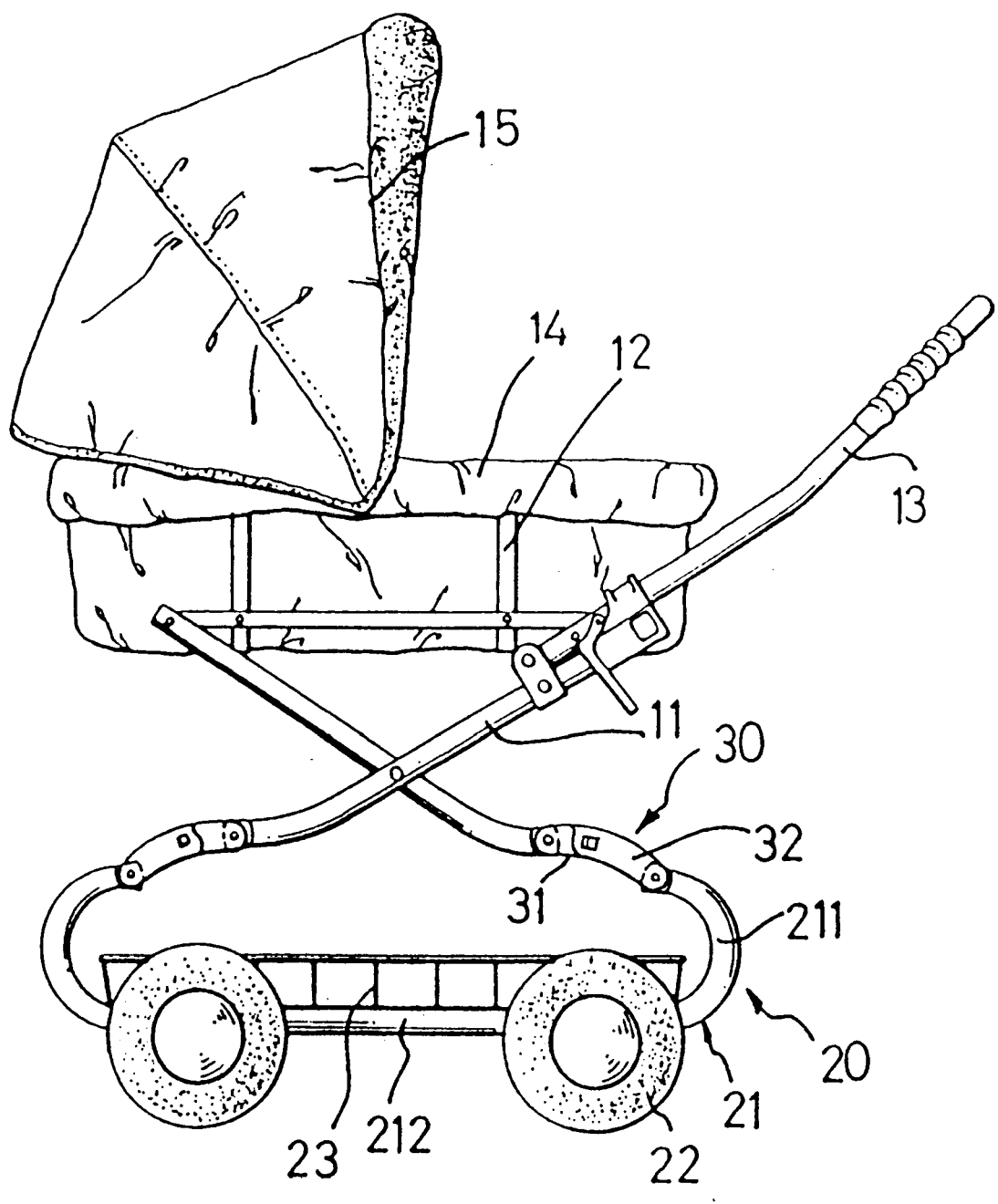
FIG. 2 is a side view of the toy stroller.

Referring to the FIGS. 1 to 4 and initially to FIG. 1, a toy stroller 10 generally includes a lower frame 20 and an upper frame 12. The lower frame 20 includes two lower beams 21 to which wheels 22 are rotatably mounted, a bracket 212 mounted to the lower beams 21, a pair of cross-hinged beams 11 connected between the bed frame 12 and the lower beams 21, and a U-shaped handle member 13 connected to upper ends of two beams 11. A padded member 14 is mounted to the upper frame 12 to define a space 121 for a toy, and a canopy 15 is provided on top of the bed frame 12.

The present invention is characterized in that a shock-absorbing device 30 is connected between a lower end of each of the cross-hinged beams 11 and an end of the associated lower beam 21. In a preferred embodiment of the invention, each end of each lower beam 21 includes a hooked section 211 for engaging with the shock-absorbing device 30.

Figure 3:
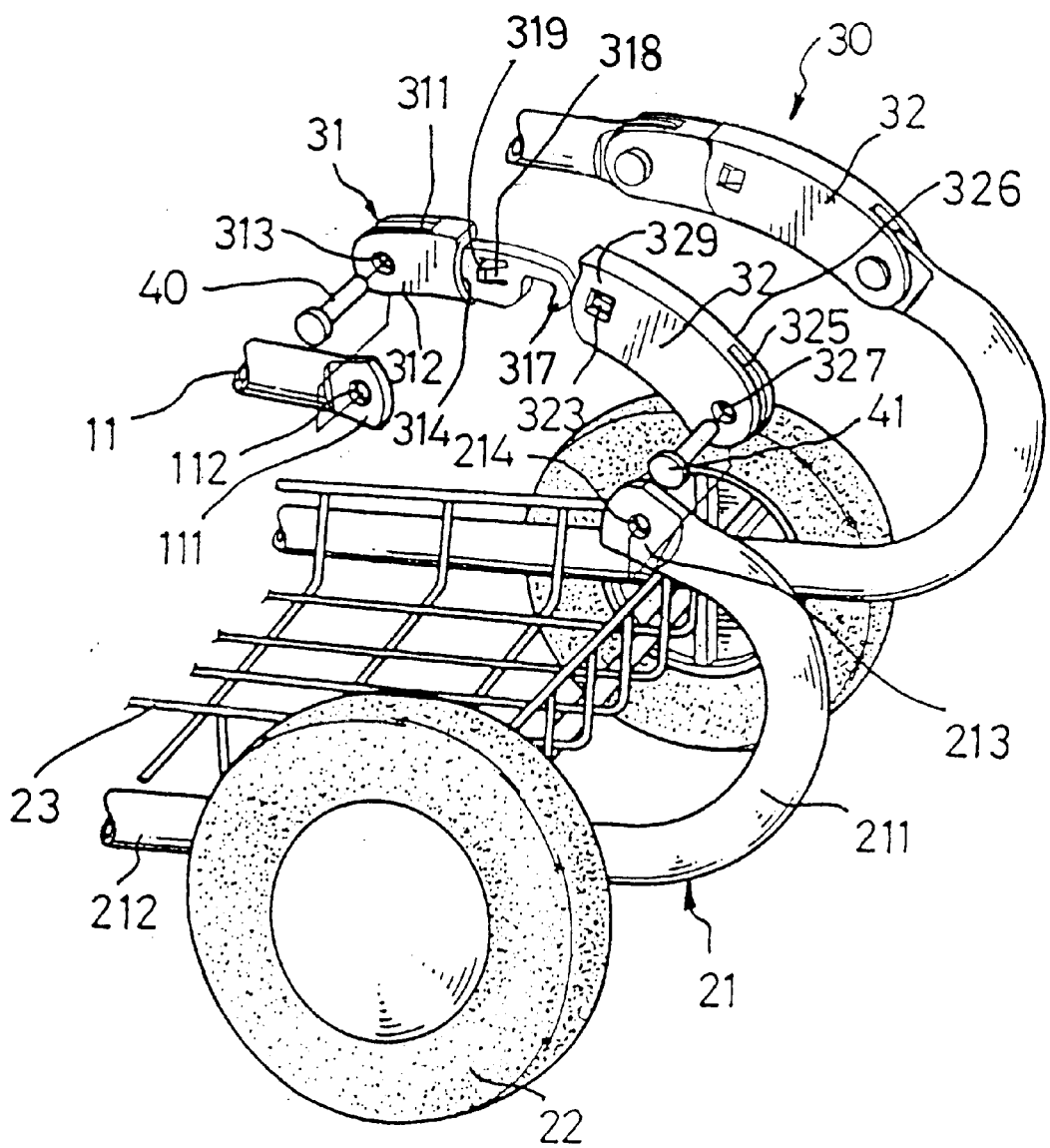
FIG. 3 is a perspective view of a portion of the toy stroller, illustrating detailed structure of the shock-absorbing device in accordance with the present invention.
Figure 4:
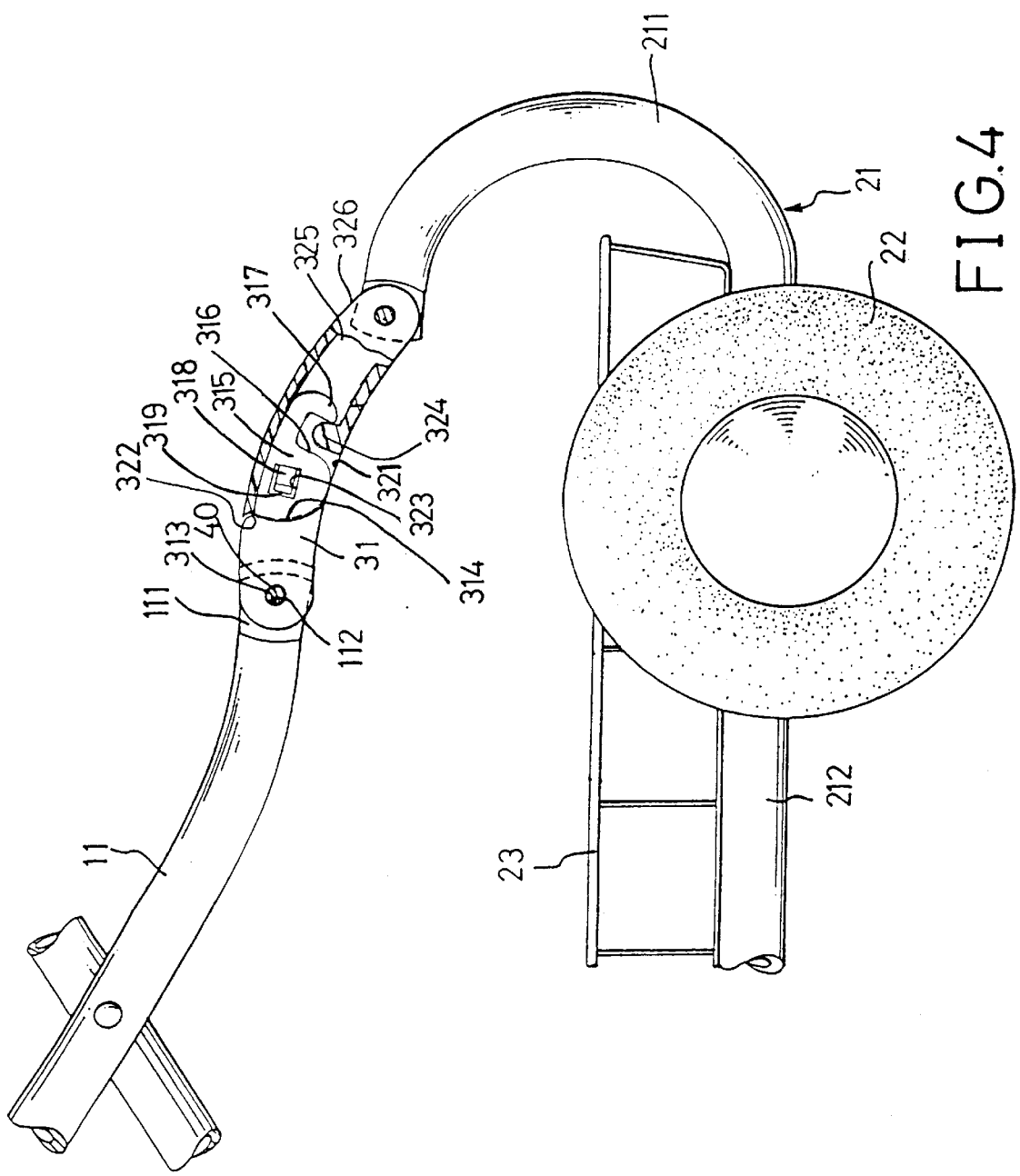
FIG. 4 is a side view, partly sectioned, of a portion of the toy stroller, illustrating detailed structure of the shock-absorbing device in accordance with the present invention.
Figure 5:
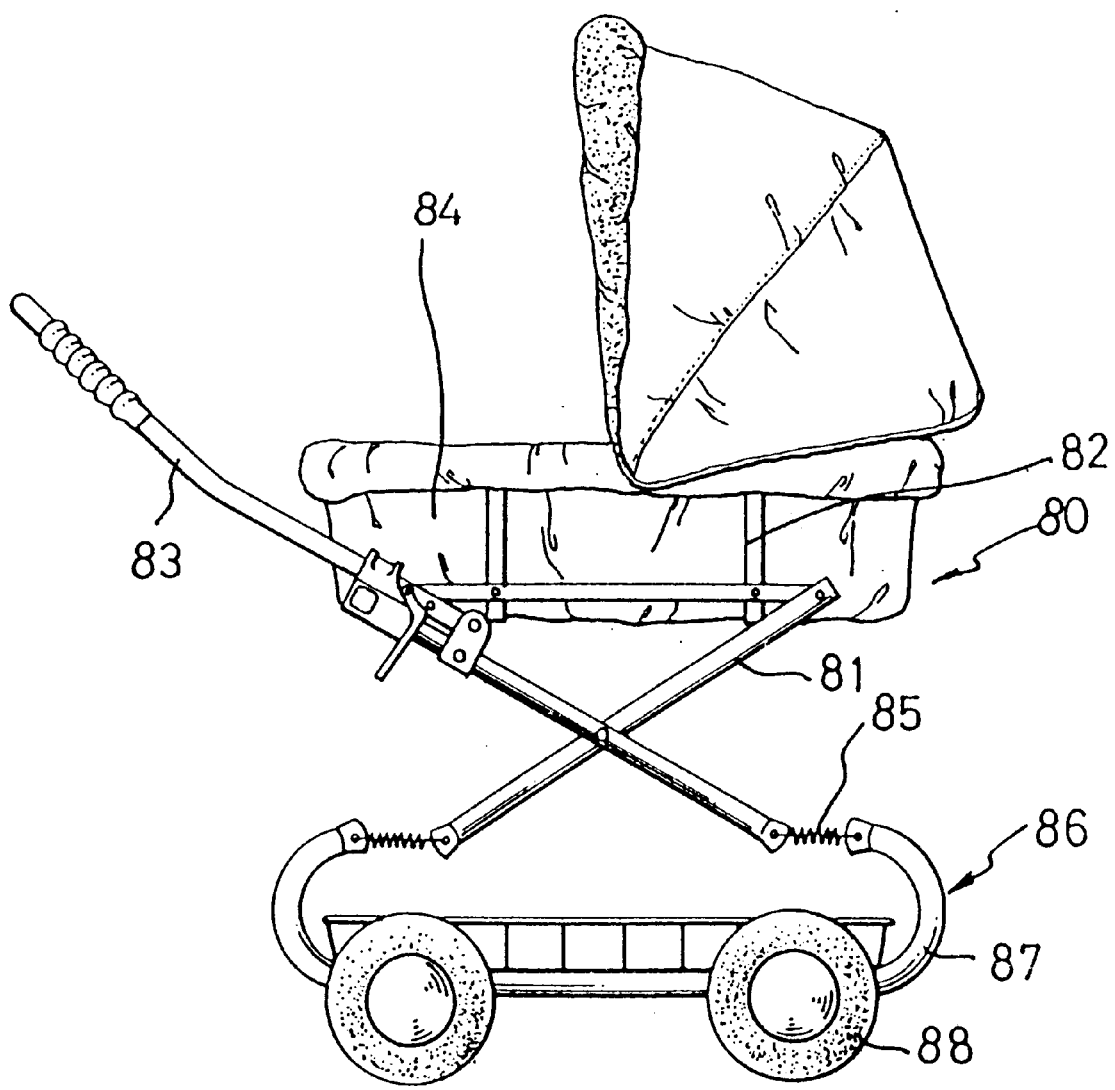
FIG. 5 is a side view of a prior art toy stroller.
Figure 6:
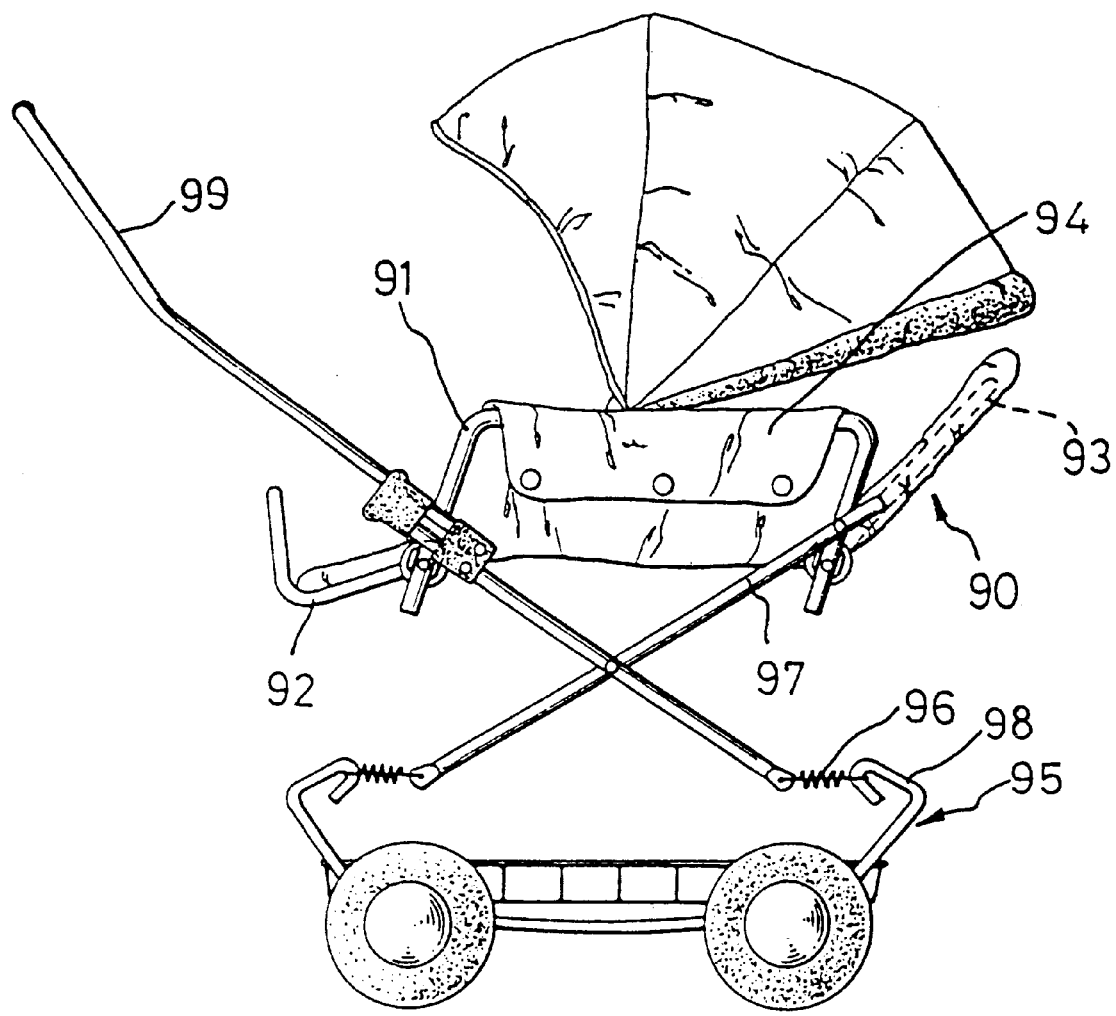
FIG. 6 is a side view of another prior art toy stroller.

Referring to FIGS. 3 and 4, the shock-absorbing device 30 in accordance with the present invention generally includes a first member 31 having a first end riveted to the lower end 111 of the associated beam 11 and a second end. In this embodiment, the first end of the first member 31 includes two lateral walls 312 defining a slit 311 therebetween, and a rivet 40 is extended through a hole 112 in the lower end 111 of the associated beam 11 and through aligned holes 313 in the lateral walls 312. The second end of the first member 31 includes a root section and a distal hooked end 317. The root section has a snapping fastener 318 provided on each of two lateral faces thereof, each snapping fastener 318 including a protrusion 319 which will be described later.

The shock-absorbing device further includes a second member 32 which has a first end riveted to the distal end of the associated hooked section 211 and a second end. In this embodiment, the first end of the second member 32 includes two lateral walls 326 defining a slit 325 therebetween, and a rivet 41 is extended through a hole 214 in the distal end 213 of the associated hooked section 211 and through aligned holes 327 in the lateral walls 326. The second end of the second member 32 includes two lateral walls 329 (FIG. 3) defining a channel 321 (FIG. 4) therebetween.

In addition, an opening 323 is defined in each lateral wall 329 of the second end of the second member 32. Further, as shown in FIG. 4, a ridge 324 is formed in the second member 32.

In assembly, after riveting the first end of the first member 31 to the associated beam 11 and riveting the first end of the second member 32 to the associated hooked section 211, the second end of the first member 31 is extended into the channel 321 of the second member 32. The distal hooked end 317 is forcibly passed through the ridge 324 and thus cannot be removed thereafter (FIG. 4). In addition, the protrusion 319 of each snapping fastener 318 is extended into the associated opening 323 such that the first member 31 and the second member 32 cannot be disengaged from each other. As a result, it is appreciated that the shock-absorbing device 30 cannot be dismantled. Thus, the toy stroller has improved safety as no exposed springs are used. It is appreciated that the first and second members 31 and 32 are made of flexible, plastic material to achieve the shock-absorbing function.

Preferably, the second end of the first member 31 includes an arcuate surface 314 (FIG. 4) while the second end of the second member 32 includes a complimentary arcuate surface 322 for engaging with the arcuate surface 314.

Although the invention has been explained in relation to its preferred embodiment, it is to be understood that many other possible modifications and variations can be made without departing from the spirit and scope of the invention as hereinafter claimed.

What is claimed is:

1. A toy stroller shock-absorbing device having a lower frame and an upper frame, the shock-absorbing device comprising:

a first member having a first end riveted to the upper frame and a second end, the second end of the first member including a root section and a distal hooked section, the root section having a snapping fastener provided on each of two first lateral faces thereof, and a second member having a second end riveted to the lower frame and a first end, the second end of the second member including two second lateral walls defining a channel therebetween through which the second end of the first member is extended, each said second lateral wall including an opening defined therein for engaging with an associated said snapping fastener, the second member further including a ridge formed therein for securely engaging with the distal hooked end of the first member.

2. The shock-absorbing device according to claim 1, wherein the second end of the first member includes a first arcuate surface, and the second end of the second member includes a second arcuate surface which is engaged with and complimentary to the first arcuate surface.

* * * * *